United States Patent [19]
Heafitz

[11] Patent Number: 4,736,216
[45] Date of Patent: Apr. 5, 1988

[54] MOTOR DRIVEN AERIAL PHOTOGRAPHIC SYSTEM

[76] Inventor: Andrew M. Heafitz, 45 Daniel St., Newton, Mass. 02159

[21] Appl. No.: 40,357

[22] Filed: Apr. 17, 1987

[51] Int. Cl.$^4$ ............................................... G03B 39/02
[52] U.S. Cl. ....................................................... 354/65
[58] Field of Search ........................ 354/65, 66, 71, 73

[56] References Cited
U.S. PATENT DOCUMENTS

| | | | |
|---|---|---|---|
| 3,224,328 | 12/1965 | Leistner | 354/73 X |
| 3,250,194 | 5/1966 | Lysle | 354/73 X |
| 3,537,369 | 11/1970 | Estes | 354/65 |

Primary Examiner—Michael L. Gellner
Attorney, Agent, or Firm—Herbert L. Bello

[57] ABSTRACT

A motor driven aerial photographic system with a lightweight frame and having a slidable carriage with a shutter and a film advance member, the carriage being slidable within a multiple track guide. The shutter is provided with a slit for exposing the film and the film advance member is provided with gripping members for advancing the film. A motor drive assembly transforms rotational movement of a gear which is driven by a motor into reciprocating linear motion for driving the carriage between a shutter cocking position and a film exposing position. The film to be exposed is engaged by the gripping members and is advanced as the carriage moves to the shutter cocking position. The film and gripping members are disengaged as the carriage moves toward the film exposing position, the film being stationary during exposure. Film guides maintain registration of the film, shutter and lens. A freely slidable protective shutter plate, which is driven by a pair of shuttle members on the carriage, covers the slit during cocking of the shutter and uncovers the shutter to permit exposure of the film as the shutter moves forwardly during the exposure period.

20 Claims, 4 Drawing Sheets

MOTOR DRIVEN AERIAL PHOTOGRAPHIC SYSTEM

BACKGROUND OF THE INVENTION

1. Field of the Invention

The present invention relates to photographic systems and, more particularly, is directed toward a motor driven aerial photographic system.

2. Description of the Prior Art

Model rocket enthusiasts are limited in their use of photographic equipment. The photographic system must be small enough to fit into the rocket and lightweight so that it will not hinder the flight. Generally, photographic equipment available for use in model rockets is limited to single shot cameras which are activated when the rocket parachute deploys after burnout. A need has arisen for a lightweight aerial photographic system which can be used in model rockets and which is capable of taking a plurality of still photographs as the rocket descends.

SUMMARY OF THE INVENTION

It is an object of the present invention to provide an aerial photographic system for taking a plurality of photographs.

It is another object of the present invention to provide an aerial photographic system which is capable of taking a plurality of photographs for use in a model rocket. The photographic system which is capable of rapid shutter cocking and film exposure includes a lightweight frame with opposing guides, each guide having a plurality of parallel track pairs. A slidable carriage having a shutter and a film advance is mounted within one pair of tracks and constrained therein for reciprocating movement. A slit is formed in the shutter and the film advance is provided with film gripping members. A drive assembly with a motor moves the carriage between a shutter cocking position and a film exposing position. A shutter plate is slidably mounted within another pair of tracks, the shutter plate being constrained for slidable movement to cover and expose the shutter slit as the carriage is moved between the shutter cocking position and the film exposing position. A film supply roll is mounted to the frame, unexposed film being housed within the film supply roll. A take-up roll, which is biased to wind the exposed film, is mounted to the frame. A lens is mounted to the frame in registration with a selected portion of the film which is threaded through film guides for travel along a specified path. Shuttles are provided on the carriage for moving the shutter plate as the carriage moves between the shutter cocking position and the film exposing position. The shutter plate covers the slit and prevents exposure of the film when the carriage is moved from the film exposing position to the shutter cocking position. As the carriage is moved from the cocking position to the film exposing position, the shutter plate remains stationary for a sufficient distance to permit the shutter slit to pass over the lens and expose the film, the film remaining stationary during exposure. As the carriage moves from the film exposure position to the shutter cocking position, the gripping members engage and advance the film one frame so that the film is readied for another exposure. The carriage is reciprocated between the shutter cocking and film exposure positions to enable taking of multiple photographs, for example, ten exposures per second.

Other objects of the present invention will in part be obvious and will in part appear hereinafter.

The invention accordingly comprises the system, together with its parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in conjunction with the accompanying drawings, wherein.

DETAILED DESCRIPTION OF THE PREFERRED EMBODIMENTS

Figure 1:
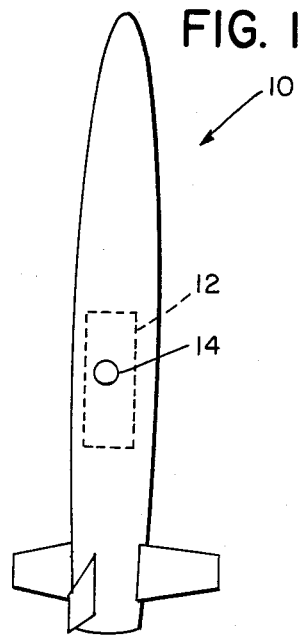
FIG. 1 is a perspective view of a model rocket having a an aerial photographic system embodying the invention mounted therein.
Figure 4:
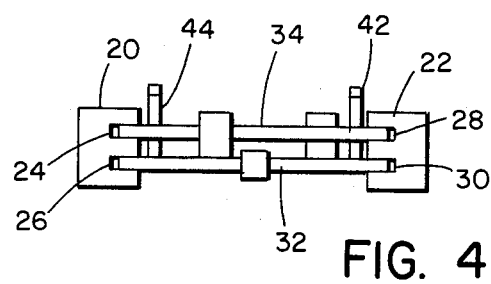
FIG. 4 is an end view of the slidable carriage assembly.
Figure 5:
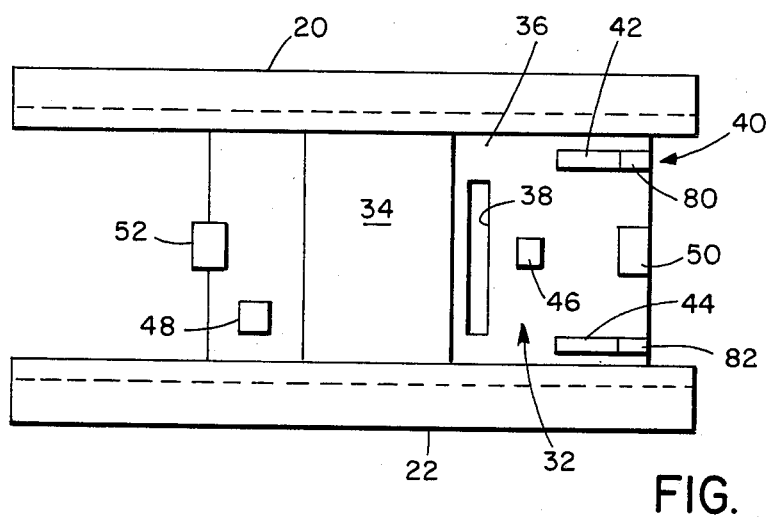
FIG. 5 is a top plan view of the slidable carriage assembly of FIG. 4.
Figure 2:
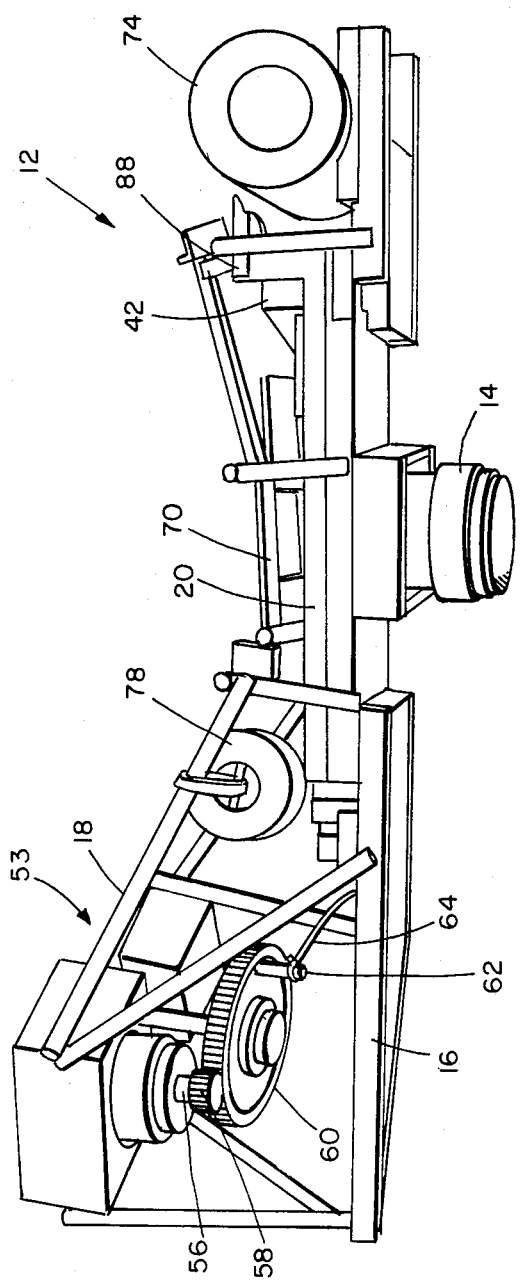
FIG. 2 is a side elevation, in perspective, of the aerial photographic system of FIG. 1.
Figure 3:
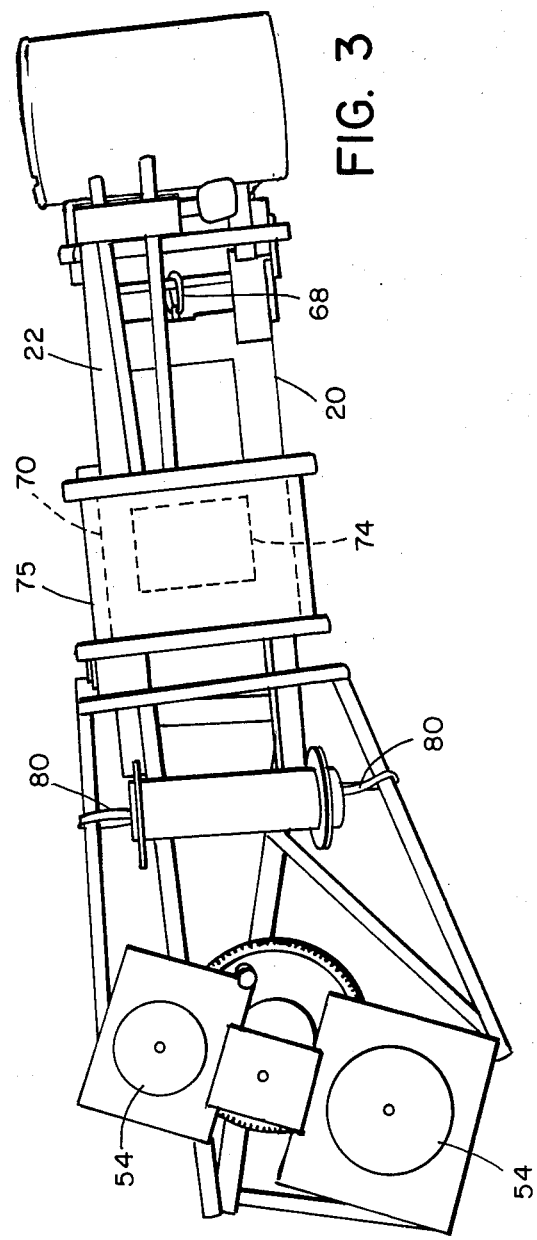
FIG. 3 is a top plan view of the aerial photographic system of FIG. 2.

Referring now to the drawings particularly FIG. 1, there is shown a model rocket 10 with an aerial photographic system 12 embodying the present invention mounted therein. A lens 14 of aerial photographic system 12 is aligned with a port 14 formed in the side of rocket 10. As best shown in FIGS. 2 and 3, photographic system 12 includes a frame 16 having a plurality of structural members or braces 18. A pair of guides 20 and 22 are mounted to opposite sides of frame 16. Guide 20 is provided with parallel tracks 24 and 26, and guide 22 is provided with parallel tracks 28 and 30. Track 24 and track 28 are in a first common plane and tracks 26 and 30 are in a second common plane, the first and second planes being and spaced parallel relationship.

A carriage 32 is slidably mounted in tracks 26 and 30, and a shutter plate 34 is slidably received in tracks 24 and 28. Accordingly, carriage 32 and shutter plate 34 are disposed in spaced parallel relationship to one another. Carriage 32 has a shutter 36 with a shutter slit 38 and an advancing member 40 having a pair of gripping members 42, 44. Slit 38 is a substantially rectangular opening whose longitudinal axis is in perpendicular relationship with the longitudinal axis of carriage 32. Gripping members 42 and 44 are mounted at one end of carriage 32. As hereinafter described, carriage 32 is provided with a pair of shuttles 46 and 48 which extend upwardly from the carriage and control movement of the shutter plate 34. Opposite ends of carriage 32 are provided with blocks 50 and 52 which are used in conjunction with a driving assembly 53 to control the linear movement of carriage 32 within tracks 26 and 30.

Carriage 32 is driven by driving assembly 53 which, in the illustrated embodiment includes a pair of motors 54, each motor having a rotating shaft 56 to which a drive gear 58 is attached. Drive gears 58 are in driving engagement with a relatively large gear 60. A rod 62 is mounted at the marginal edge of gear 60, the rod extending downwardly. A driving link 64, for example a flexible cable is attached between post 62 and block 52. A biasing element 68, for example an elastic band, is attached between block 50 and frame 16. As motors 54 turn, gear 60 rotates and rod 62 moves in a circular path. As rod 62 moves in a circular path, carriage 32 moves in a linear path. The driving force of motors 54 is sufficient to pull carriage 32 against the force exerted by a biasing element 68. As post 62 approaches block 52, biasing element 68 pulls carriage 32 toward the right as viewed in FIG. 3.

Figure 6:
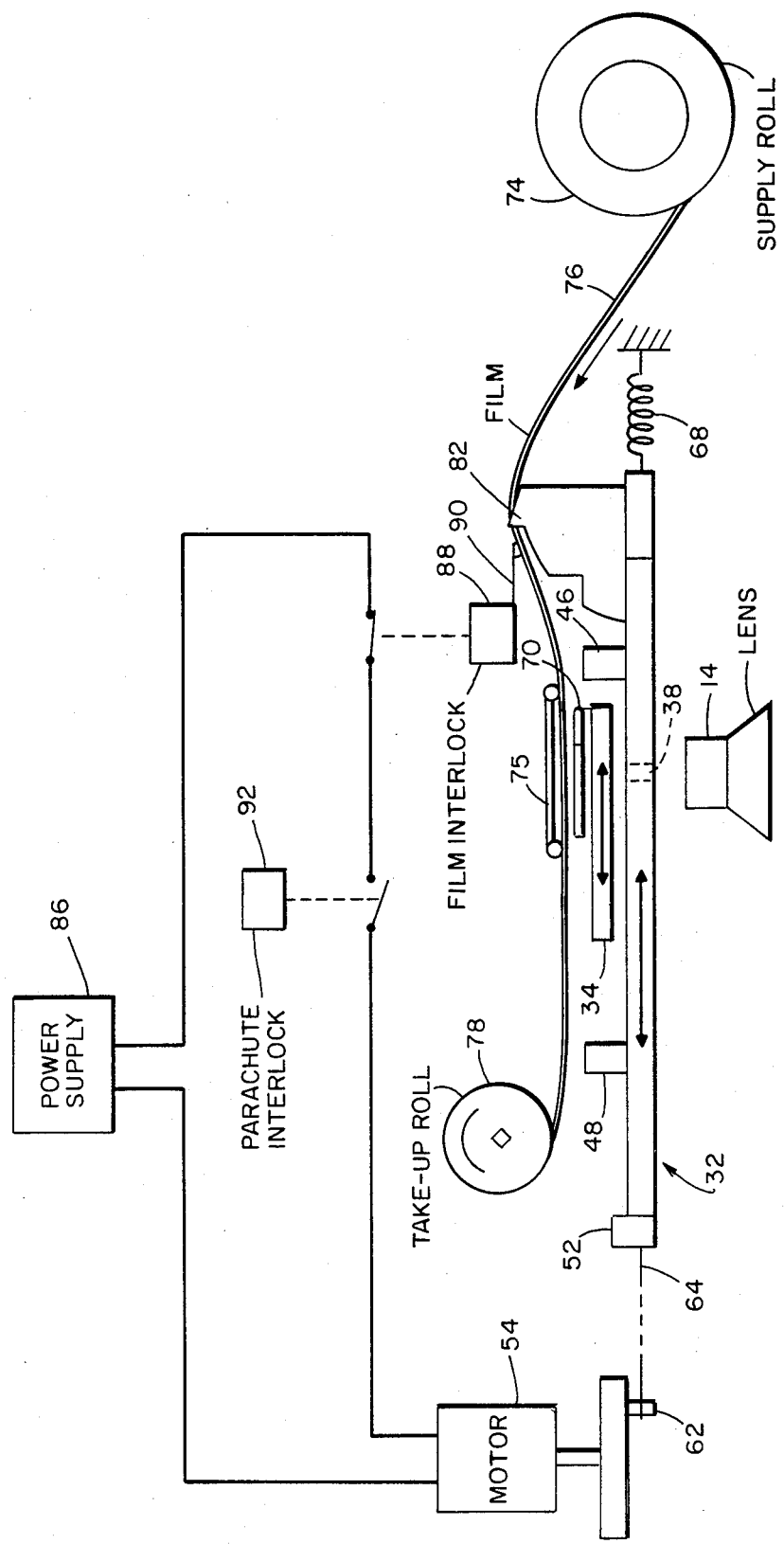
FIG. 6 is a schematic diagram illustrating the operation of the aerial photographic system.

Lens 14 is mounted to frame 16 below carriage 32. An exposure plate 70 is mounted to frame 16 above shutter plate 34. The exposure plate 70 has a rectangular window or opening 72 which is in alignment with lens 14, the window defining the size of the exposed frame. A film guide 75 is positioned above the exposure plate 70, the film 76 being threaded between the exposure plate and film guide. A feed roll 74 is positioned at the end of frame 16 which is adjacent gripping members 40, 42 and block 50. Feed roll 74 is configured to hold a roll of unexposed film 76 (FIG. 6). A take-up roll 78 which is operatively connected to frame 16 via braces 18, is positioned between motor 54 and lens 14. Take-up roll 78 is mounted to braces 18 by means of a pair of biasing elements 80, for example elastic bands. That is, take-up roll 78 is wound in a counterclockwise direction as viewed in FIG. 6 and film 76 is attached to the take-up roll. As film 76 advances, it is wound on take-up roll 78. The force exerted by brasing elements 80 is not sufficient to advance film 76.

Film 76 is advanced by gripping members 42 as carriage 32 moves to the shutter cocking position which is to the left as viewed in FIG. 2. As carriage 32 moves to the left, fingers 80 and 82 on gripping members 42 and 44, respectively, engage sprocket holes in film 76 (not shown) and advance the film a preselected distance which is equal to one frame.

Figure 7A:
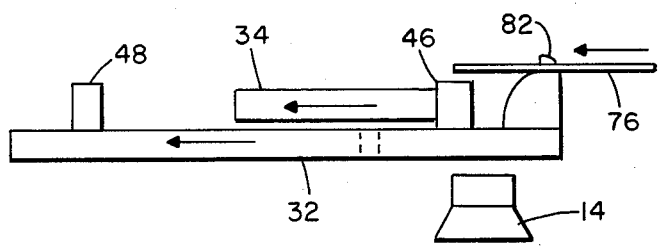
FIGS. 7A through 7E are schematic representations showing movements of the slidable carriage assembly between the shutter cocking position and the film exposing position.
Figure 7B:
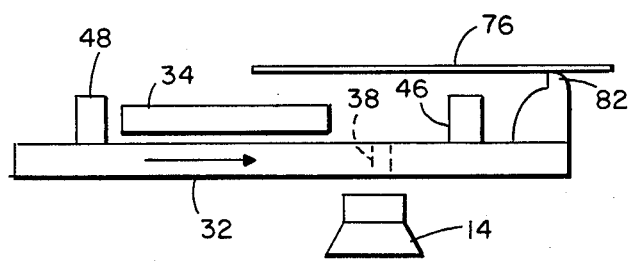
Figure 7C:
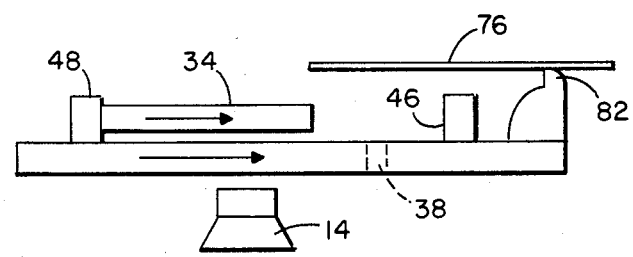

As shown in FIGS. 7A through 7E, as carriage 32 moves to the left, which is the shutter cocking position, film 76 advances. When carriage 32 moves to the right toward the film exposing position, film 76 remains stationary. The winding force exerted by biasing elements 80 on take-up roll 76 is not great enough to advance the film. In FIG. 7A, carriage 32 is moving toward the shutter cocking position and film 76 is advancing therewith. Shutter plate 34, which is freely slidable in tracks 24 and 28, is moved toward the shutter cocking position by shuttle 46. In FIG. 7B, carriage has started to move from the shutter cocking position to the film exposing position. In this case, the film sprocket holes are not engaged by fingers 80, 82 and the film does not move. In addition, shutter plate 34 remains stationary because it has not been contacted by shuttle 48. Slit 38 is in alignment with lens 14 and film 76 is exposed. As carriage 32 continues to move to the right, slit 38 moves out of registration with lens 14 and shutter plate 34 is moved to the right by shuttle 48 as shown in FIG. 7C. Carriage 32 has traveled to the film exposing position by the pulling effect of biasing member 68.

Figure 7D:
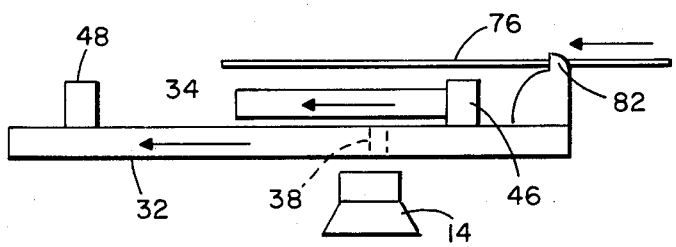
Figure 7E:
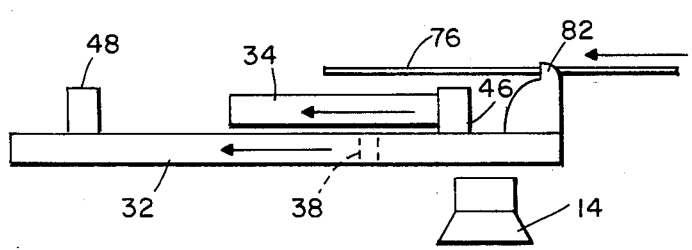

In FIG. 7D, carriage 32 has started its movement towards the shutter cocking position, fingers 80, 82 engage the film sprocket holes. Shutter plate 34 covers slit 14 and blocks exposure of film 76 as it advances one frame. Carriage 32 continues to move until it reaches the shutter cocking position as shown in FIG. 7E. The position shown in FIG. 7E is the same as the starting position shown in FIG. 7A. It is to be noted that carriage 32 is pulled to the shutter cocking position by link 64 which is connected to rod 62. That is, as rod 62 travels in a circular path carriage 32 moves in a linear path between the shutter cocking position and the film exposing position. Carriage 32 is in the shutter cocking position when rod 62 is positioned at its far left position as viewed in FIG. 2 and in the film exposing position when the rod is at the far right. The detailed operation of aerial photographic system 12 is best shown in FIG. 6.

Referring now to FIG. 6, it will be seen that motor 54 is driven by a power supply 86 which is mounted in rocket 10. A film interlock switch 88, which is mounted to frame 16, has an extending arm 90 which contacts and senses film 76 as it advances from supply roll 74. Film interlock switch 88 is in its closed state when finger 90 senses film 76. Upon exposure of the entire roll of film, finger 90 no longer contacts film 76 and film interlock switch opens, Power supply 86 is disconnected from motor 54. A parachute interlock switch 92 which is activated to its closed state upon deployment of the parachute, energizes motor 54 provided interlock switch 88 is closed. When motor 54 is energized, rod 62 travels in a circular path and pulls carriage 32 to the shutter cocking position. As rod 62 continues to move in the circular path, biasing element 68 moves carriage 32 to the film exposing position and the film 76 is exposed. In the illustrated embodiment, by way of example, aerial photographic system 10 is configured to take ten frames per second. That is, motors 54 reciprocate at a rate which exposes ten picture frames per second.

Preferably, frame 16 is constructed of a lightweight material, for example balsa wood or a lightweight plastic. In the illustrated embodiment, the length of shutter plate 34 is less than one half the longitudinal distance between shuttles 46 and 48. As previously noted, shuttle 46 moves shutter plate toward the shutter cocking position and shuttle 48 moves the shutter plate towards the film exposing position. Shutter plate 34 covers the shutter slit 38 when carriage 32 is moving toward the shutter cocking position and the shutter plate is positioned away from the slit during exposing of the film. Although two motors have been shown, it will be readily appreciated that a single motor can be used to drive carriage 32.

Since certain changes may be made in the foregoing disclosure without departing from the scope of the invention herein involved, it is intended that all matter contained in the above description and depicted in the accompanying drawings be construed in an illustrative and not in a limiting sense.

What I claim is:

1. A photographic system comprising:
   (a) a frame having a guide with first and second pairs of tracks;
   (b) a slidable carriage having a shutter and a film advance, said carriage mounted for reciprocating slidable movement in a first plane within said first pair of tracks, a slit formed in said shutter, said film advance having film gripping means;
   (c) a shutter plate slidably mounted in said second pair of tracks, said shutter plate constrained for slidable movement in a second plane which is in spaced parallel relationship with said first plane;

(d) motor means operatively connected to said carriage for linearly reciprocating said carriage between a shutter cocking position and a film exposing position;
(e) a lens mounted to said frame;
(f) film guide means for guiding film along a specified path; and
(g) first and second shuttle means mounted at opposite ends of said carriage, the length of said shutter plate is less than one half the distance between said first and second shuttle means, said first shuttle means moving said shutter plate in a first direction as said carriage moves toward said shutter cocking position and said second shuttle means moving said shutter plate in a second direction toward said film exposing position moves toward said exposing position;
(h) said shutter plate covering said slit and preventing exposure of the film when said carriage is moved in said first direction to said cocking position, said second shuttle means moving said shutter plate in said second direction after said carriage has moved in said second direction, said carriage moving a sufficient distance in said second direction to expose the film, said shutter plate moving in said second direction to a position to cover said slit and prevent exposure of the film as said carriage reverses direction and moves in said first direction to said cocking position.

2. The photographic system as claimed in claim 1 wherein said drive means includes at least one motor and a power source for driving said motor, said motor having an extending shaft, an annular driving member attached to said shaft, a post mounted to said annular driving member at one side thereof, a rotational axis of said shaft in perpendicular registration with a longitudinal axis of said carriage; a driver, one end of said driver connected to said post and an opposite end of said driver connected to said carriage, said one end of said driver moving in a circular path as said shaft rotates, said other end of said driver constrained for linear movement as said driver rotates, said carriage reciprocating in said first and second directions as said shaft rotates.

3. The photographic system as claimed in claim 2 including bias means attached to said carriage means and said frame means, said bias means pulling said carriage toward said film exposing position, said motor being sufficient to overcome said bias means and move said carriage into said shutter cocking position.

4. The photographic system as claimed in claim 1 including a film supply roll and a film take-up roll, said film supply roll mounted to said frame at one end of said carriage, said film take-up roll mounted to said frame at an opposite end of said carriage.

5. The photographic system as claimed in claim 4 including take-up means connected to said film take-up roll for winding exposed film on said film take-up roll.

6. The photographic system as claimed in claim 3 including first interlock means connected to said frame and positioned to contact and sense the presence of the film advancing from said supply roll to said take-up roll, said interlock means disengaging said motor from said supply when all the film has been exposed.

7. The photographic system as claimed in claim 3 including second interlock means connected to said frame and positioned to contact and sense the presence of the film advancing from said supply roll to said take-up roll, said interlock means disengaging said motor from said supply when all the film has been exposed.

8. An aerial photographic system for taking a plurality of pictures by exposing photographic film from an airborne vehicle, said system comprising:
(a) a light-weight frame having a guide with first and second pairs of tracks;
(b) a slidable carriage having a shutter and a film advance, said carriage mounted for reciprocating slidable movement in a first plane within said first pair of tracks, a slit formed in said shutter, said film advance having film gripping means;
(c) a shutter plate slidably mounted in said second pair of tracks, said shutter plate constrained for slidable movement in a second plane which is in spaced parallel relationship with said first plane;
(d) motor means operatively connected to said carriage for linearly reciprocating said carriage between a shutter cocking position and a film exposing position;
(e) a lens mounted to said frame;
(f) film guide means for guiding film along a specified path;
(g) a film supply roll mounted to said frame for feeding film;
(h) a take-up roll for collecting exposed film;
(i) first and second shuttle means mounted at opposite ends of said carriage, the length of said shutter plate is less than one half the distance between said first and second shuttle means, said first shuttle means moving said shutter plate in a first direction as said carriage moves toward said shutter cocking position and said second shuttle means moving said shutter plate in a second direction toward said film exposing position moves toward said exposing position;
(j) said shutter plate covering said slit and preventing exposure of the film when said carriage is moved in said first direction to said cocking position, said second shuttle means moving said shutter plate in said second direction after said carriage has moved in said second direction, said carriage moving a sufficient distance in said second direction to expose the film, said shutter plate moving in said second direction to a position to cover said slit and prevent exposure of the film as said carriage reverses direction and moves in said first direction to said cocking position.

9. The photographic system as claimed in claim 8 wherein said motor means includes at least one motor and a power source for driving said motor, said motor having an extending shaft, an annular driving member attached to said shaft, a post mounted to said annular driving member at one side thereof, a rotational axis of said shaft in perpendicular registration with a longitudinal axis of said carriage; a driver, one end of said driver connected to said post and an opposite end of said driver connected to said carriage, said one end of said driver moving in a circular path as said shaft rotates, said other end of said driver constrained for linear movement as said driver rotates, said carriage reciprocating in said first and second directions as said shaft rotates.

10. The photographic system as claimed in claim 9 including bias means attached to said carriage means and said frame means, said bias means pulling said carriage toward said film exposing position, said motor being sufficient to overcome said bias means and move said carriage into said shutter cocking position.

11. The photographic system as claimed in claim 10 including a film supply roll and a film take-up roll, said film supply roll mounted to said frame at one end of said carriage, said film take-up roll mounted to said frame at an opposite end of said carriage.

12. The photographic system as claimed in claim 11 including take-up means connected to said film take-up roll for winding exposed film on said film take-up roll.

13. The photographic system as claimed in claim 12 including first interlock means connected to said frame and positioned to contact and sense the presence of the film advancing from said supply roll to said take-up roll, said interlock means having opened and closed states, said motor energized when said first interlock means is in said closed state and deenergized when said first interlock means is in said opened state, said first interlock means changing from said closed state to said second state when all the film has been exposed.

14. The photographic system as claimed in claim 13 including second interlock means connected to a parachute in the vehicle, said second interlock means having opened and closed states, said second interlock means changing from said opened position to said closed state when the parachute is deployed, said motor energized when said first and second interlock means are in said closed states, said motor deenergized when either of said first and second interlock means is in said opened state.

15. An aerial photographic system for use in a model rocket, said system comprising:
(a) a lightweight frame having a guide with first and second pairs of tracks;
(b) a slidable carriage having a shutter and a film advance, said carriage mounted for reciprocating slidable movement in a first plane within said first pair of tracks, a slit formed in said shutter, said film advance having film gripping means;
(c) a shutter plate slidably mounted in said second pair of tracks, said shutter plate constrained for slidable movement in a second plane which is in spaced parallel relationship with said first plane;
(d) motor means operatively connected to said carriage for linearly reciprocating said carriage between a shutter cocking position and a film exposing position;
(e) a lens mounted to said frame;
(f) film guide means for guiding film along a specified path;
(g) a film supply roll mounted to said frame for feeding film;
(h) a take-up roll for collecting exposed film;
(i) first and second shuttle means mounted at opposite ends of said carriage, the length of said shutter plate is less than one half the distance between said first and second shuttle means, said first shuttle means moving said shutter plate in a first direction as said carriage moves toward said shutter cocking position and said second shuttle means moving said shutter plate in a second direction toward said film exposing position moves toward said exposing position;
(j) said shutter plate covering said slit and preventing exposure of the film when said carriage is moved in said first direction to said cocking position, said second shuttle means moving said shutter plate in said second direction after said carriage has moved in said second direction, said carriage moving a sufficient distance in said second direction to expose the film, said shutter plate moving in said second direction to a position to cover said slit and prevent exposure of the film as said carriage reverses direction and moves in said first direction to said cocking position.

16. The photographic system as claimed in claim 15 wherein said motor means includes two motors and a power source for driving said motors, each said motor having an extending shaft, a gear attached to each said shaft, a drive gear driven by said shaft gears, a post mounted to said drive gear at one side thereof, a rotational axis of each said shaft being in perpendicular registration with a longitudinal axis of said carriage; a driver, one end of said driver connected to said post and an opposite end of said driver connected to said carriage, said one end of said driver moving in a circular path as said drive gear rotates, said other end of said driver constrained for linear movement as said drive gear rotates, said carriage reciprocating in said first and second directions as said shaft rotates.

17. The photographic system as claimed in claim 16 including bias means attached to said carriage means and said frame means, said bias means pulling said carriage toward said film exposing position, said motors being sufficient to overcome said bias means and move said carriage into said shutter cocking position.

18. The photographic system as claimed in claim 17 including a film supply roll, a film take-up roll and take-up drive means, said film supply roll mounted to said frame at one end of said carriage, said film take-up roll mounted to said frame at an opposite end of said carriage, said take-up drive means connected to said film take-up roll for winding exposed film on said film take-up roll.

19. The photographic system as claimed in claim 18 including first interlock means connected to said frame and positioned to contact and sense the presence of the film advancing from said supply roll to said take-up roll, said first interlock means having opened and closed states, said motor energized simultaneously when said first interlock means is in said closed state and deenergized when said first interlock means is in said opened state, said first interlock means changing from said closed state to said second state when all the film has been exposed.

20. The photographic system as claimed in claim 19 including second interlock means connected to a parachute in the rocket, said second interlock means having opened and closed states, said second interlock means changing from said opened position to said closed state when the parachute is deployed, said motor energized when said first and second interlock means are in said closed states, said motor deenergized when either of said first and second interlock means is in said opened state.

* * * * *